J. SAJDA.
MILK BOILER.
APPLICATION FILED JUNE 8, 1915.

1,174,355.

Patented Mar. 7, 1916.

Inventor
J. Sajda

By N. M. Wilson
Attorney

UNITED STATES PATENT OFFICE.

JUSTIN SAJDA, OF LANSFORD, PENNSYLVANIA.

MILK-BOILER.

1,174,355.  Specification of Letters Patent.  Patented Mar. 7, 1916.

Application filed June 8, 1915. Serial No. 32,870.

*To all whom it may concern:*

Be it known that I, JUSTIN SAJDA, a citizen of the United States, residing at Lansford, in the county of Carbon and State of Pennsylvania, have invented certain new and useful Improvements in Milk-Boilers, of which the following is a specification.

This invention relates to certain new and useful improvements in milk boilers.

The primary object of this invention is to provide a kitchen utensil adapted for boiling milk and other fluids which produce foaming and are likely to boil over and become wasted during the operation.

A further object of the device is to provide a cover for a milk boiler so arranged as to allow the air and gases found in the foam which is produced during the boiling operation to pass off, thus reducing the foaming of the fluid to a minimum and permitting the perfect boiling of the milk.

A still further object of the invention is to provide a milk boiler cover having a means for reducing the degree of foaming of the milk and also returning to the boiler any milk which may overflow the same.

With these general objects in view and others that will appear as the nature of the invention is better understood, the same consists in the novel combination and arrangement of parts hereinafter more fully described, illustrated in the accompanying drawings, and pointed out in the appended claim.

Figure 1:
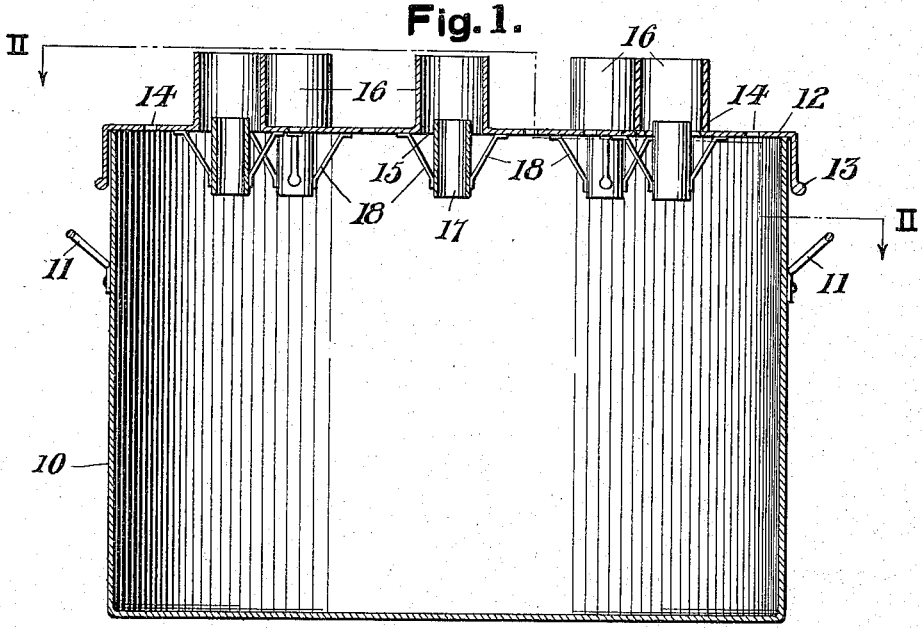
Figure 2:
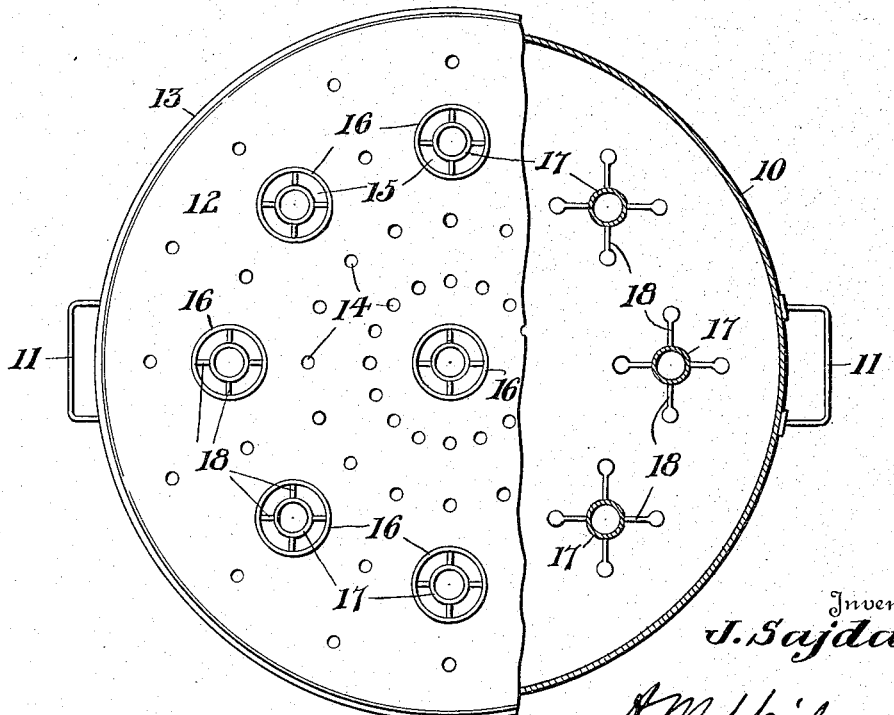

In the drawings forming a part of this application and in which like designating characters refer to corresponding parts throughout the several views:—Figure 1 is a diametrical sectional view taken through the device, and, Fig. 2 is a top plan view thereof partially in transverse section upon the line II—II of Fig. 1.

Referring more in detail to the drawings, the present device consists of a cylindrical boiler 10 of substantially the usual form and adapted to receive milk or other fluid which is to be boiled, the said boiler being provided with opposite handles 11. A lid 12 is removably seated upon the top of the boiler having a depending overlying annular flange 13 while a plurality of perforations 14 are arranged through the said lid. Circular openings 15 are also provided through the lid 10, one of the same being centrally positioned and the remainder being arranged in a circle therearound while each of the openings has an outwardly projecting tubular flange 16, the flanges of all of the said openings being of the same diameter and length. An outlet tube 17 is concentrically positioned within each of the opening flanges 16 being suspended by means of bracket arms 18 attached to the lower face of the lid 12 so as to extend into the boiler 10 when the lid is positioned thereupon and to extend slightly within the inner ends of the said flanges 16 through the openings 15.

From this detailed description of the device, it will be seen that when milk or other fluid is placed in the boiler 10 and the lid 12 is mounted thereon as best illustrated in Fig. 1, the foam formed when the fluid boils surrounds the outlet tube 17, and the air and gases in the foam escape through the said tubes and through the flanges 16, whereby the foaming is reduced. When the air bubbles in the foam rise and contact the lower ends of the tubes 17, the bubbles are broken or destroyed, and the air and gases therein will pass upwardly through the tubes and around the same to the member 16 to escape into the atmosphere. In the event however, that the boiling is so great that the tubes 17 are unable to carry off the necessary amount of air and gases to reduce foaming, the fluid will overflow the flanges 16 and will fall upon the lid 12 and return to the boiler 10 through the lid perforations 14.

It will thus be seen that a boiler lid is provided which is cheap and easy to manufacture, and which may be employed with different boilers.

While the form of the invention herein shown and described is what is believed to be the preferred embodiment thereof, it is nevertheless to be understood that minor changes may be made without departing from the spirit and scope of the invention as set forth in the appended claim.

What I claim as new is:—

A device of the class described, comprising a fluid container, a flanged lid including a flat wall removably mounted thereon and provided with a central opening and with a circular row of similar openings extending therethrough and being further provided with a plurality of intermediately arranged fluid inlet perforations, upstanding flanges of equal diameter and length mounted upon the said lid surrounding the said openings therein, a gas outlet tube for each of the said flanges extending inwardly of the container and projecting slightly within the base portion of the said flanges and arranged concentrically therewith, and bracket arms carried by the lower face of the said lid and connected adjacent the inner ends of the said tubes, the said outlet tubes adapted to be engaged by the bubbles in the foam to break the bubbles and permit the air and gases to escape therethrough.

In testimony whereof I affix my signature in presence of two witnesses.

JUSTIN SAJDA.

Witnesses:
 JOZEF PAVLIK,
 MATTHEW SKAPIK.

Copies of this patent may be obtained for five cents each, by addressing the "Commissioner of Patents, Washington, D. C."